United States Patent [19]

Grone et al.

[11] Patent Number: 4,557,783
[45] Date of Patent: Dec. 10, 1985

[54] COMPOSITE TAPE LAYING MACHINE AND METHOD

[75] Inventors: Robert J. Grone, Elsmere, Ky.; Leonard R. Schnell, Okeana; Wayne L. Vearil, Milford, both of Ohio

[73] Assignee: Cincinnati Milacron Inc., Cincinnati, Ohio

[21] Appl. No.: 557,910

[22] Filed: Dec. 5, 1983

[51] Int. Cl.⁴ .................. B29C 27/22; B65H 17/46; B32B 31/00
[52] U.S. Cl. .................................. 156/257; 156/268; 156/270; 156/353; 156/361; 156/523; 156/540; 156/584; 156/249
[58] Field of Search ............... 156/256, 268, 270, 269, 156/353, 361, 362, 363, 584, 517, 522, 523, 538, 540, 527, 433, 257, 247, 249

[56] References Cited

U.S. PATENT DOCUMENTS

| | | | |
|---|---|---|---|
| 3,574,040 | 4/1971 | Chitwood et al. | 156/522 |
| 3,775,219 | 11/1973 | Karlson et al. | 156/363 |
| 3,810,805 | 5/1974 | Goldsworthy et al. | 156/525 X |
| 4,133,711 | 1/1979 | August | 156/353 |
| 4,285,752 | 8/1981 | Higgins | 156/517 X |
| 4,292,108 | 9/1981 | Weiss et al. | 156/530 X |
| 4,328,061 | 5/1982 | Off et al. | 156/361 |

FOREIGN PATENT DOCUMENTS

2529871 1/1984 France .
2101519 1/1983 United Kingdom .

Primary Examiner—Edward Kimlin
Assistant Examiner—Ramon R. Hoch
Attorney, Agent, or Firm—Daniel P. Worth

[57] ABSTRACT

An improved method and apparatus for compacting a composite tape tail which is formed by making a cut along an oblique line across the tape and manipulating first and second compaction means. The cut, however, severs only the tape while it is adhered to the backing but does not sever the backing or subjacent support (which is usually a strip of paper). The backing is then peeled away from the strip at a location between the first compaction means shoe, blade, or pad) and a second compaction means (preferably a roller) and conveys the discarded portion of tape to storage, disposal etc. The first compaction means bears down on the assembly of tape and backing. The second compaction means engages the tape after the peeling away, hence bears down on only the tail. Only one compaction means is used at a time. The second compaction means compactingly engages the tail not later than the arrival of the tail leading edge at said second means by which time the first compacting means has stopped compacting. Power means, such as an air cylinder, move or switch the two compaction means into and out of respective positions for compaction so that the full width tape is compacted by the first compaction means and the tail (oblique strip without any backing) is compacted by the second compaction means.

20 Claims, 30 Drawing Figures

COMPOSITE TAPE LAYING MACHINE AND METHOD

BACKGROUND

This invention relates to an improvement in composite tape technology, more particularly to a machine and method for laying composite tape to form a laminated structural member. An aspect of the invention is a machine for compaction of the tail of a tape strip cut at a shallow angle, for example 60° to 80°, from a line normal to the longitudinal axis of the tape. An aspect of the invention is a process of compacting a tape tail as aforesaid substantially all the way to the end of the tail. An aspect of the invention is to provide machine and process for compacting a tape tail which has been peeled away from the backing material.

Composite tapes and machines and methods for handling the same are described in a number of prior art publications. By composite tape, we refer to a strip of tectonic unidirectional filaments in a resinous matrix. The tape is removably adhered to a backing, usually a paper backing which can be peeled away. The tape is laid in parallel rows, one layer on top of another with adjacent layers usually laid in separate directions to create grain and cross grain features. Structures so made are polymerized i.e. the resinous matrix is cured in some fashion as by cross-linking, polymerizing, etc.) to form structural components, most commonly components of aircraft such as the horizontal and vertical stabilizer skins in lieu of the more conventional and older metallic skins, although automotive parts such as leaf springs are being made of composite material. The resin composition, filaments (which may be graphite, carbon, or in some case even glass) and matrices are well-known. Such structures—and for that matter the tapes—can be laid by hand, but the present invention is directed to a machine and process for laying the tape.

Prior art publications of interest here as representative of the state-of-the-art are U.S. Pat. No. 3,574,040 to Chitwood et al, U.S. Pat. No. 4,351,688 to Weiss et al, British Published application 2,101,519A to Murray et al, and U.S. Pat. No. 3,775,219 to Karlson and Hardesty.

The present invention is particularly concerned with compaction of the tail of an obliquely cut tape. Heretofore, compaction of such tails all the way to the end of the tape has presented a problem, especially on cut in excess of 60° from a cut normal to the longitudinal tape axis (said normal cut being commonly called "straight across"). A long tail resulting from such a shallow cut presents a number of manufacturing and quality control problems. As one goes further along the tail towards its end, bearing pressure of the unused tapered tape tail itself (due to diminishing lateral size) may cause the unused length of tape to adhere more strongly to the mold and to the tail, thus creating delamination problems when the unused tape is removed. Experience has shown that the latter half of an elongated tail presents the worst problem because of the narrowing width.

Some of the prior art solutions to these problems have been to limit the angle of cut to some small amount, oftentimes 60°; to limit the tape laying pressure to the first half of the tail and completing the compaction and trimming manually; and refraining from lay directions and laminated structures that would require a long tail.

The present invention has for an object provision of machine and method for compacting tape having a long tail substantially the full length of the tail regardless of how shallow or oblique the tail is cut. The present invention has for an object the provision of a method and machine for compacting tape by separating tape from the substrate or carrier on which it is usually carried and then applying compacting pressure only to the tail portion of the tape, thereby obviating many of the difficulties arising from having to separate the substrate or other support after compaction has taken place.

The present invention provides, among other things, a process of laying and compacting composite tape comprising the steps of cutting or severing the tape but not severing the support (such as backing paper release paper, etc.), separating the support and the tape, and applying the tape to a mold while storing the support material. The process preferably includes cutting the tape obliquely (thus forming a tail) before separating the support from the tail, being sure as before to not sever the support. Apparatus for laying composite material according to the invention includes means to separate the support material from the composite strip before compacting the strip against the mold, involving first and second compaction means, with the second such means being disposed between the support and tape at a location trailing the first compaction means which second means is located to apply compacting pressure to the tape—usually the tail—only and means to position the respective compaction means for compacting at different times.

An important feature of the process and of the compaction apparatus is separating the support from the tape before compacting the tail. A machine according to the invention provides means to do this. The machine and process of this invention each contemplate cutting or severing the tape but not severing the backing paper (i.e. substrate, or other support) on which the tape comes mounted. Both the machine and process also contemplate switching from a compaction means that applies pressure to the assembly of backing and tape to a means that applies pressure only to the tail after the backing and tail portion of the tape have been separated.

Other objects, advantages and features of the invention will be now described in the following specification and annexed drawings in which, where appropriate, the same reference number represents the same part or a similar part:

FIG. 3B is a schematic top view of the tape, tail, and line of compaction of the second compaction means for the apparatus positioned as in FIG. 3a;

FIG. 4B is a schematic top view of the tape, tail, and compaction line as they would appear for FIG. 4A;

FIG. 5A schematically depicts the principal components of the system in the position they would be when the tail trailing edge comes under the second compaction means;

FIG. 5B is a top schematic view of the tape, mold edge, and tape trailing edge when the latter comes under the second compaction or tail compacting means;

FIGS. 12, 13, 14A and 14B show another embodiment of an apparatus for practicing the present invention, especially for wide tape (e.g. 12 inches wide) on a fairly flat mold, wherein FIGS. 12 and 13, respectively, are side elevation and cross-section views of the alternative apparatus in tape laying and in tail compacting (dotted) positions, respectively, as both seen from the side.

FIGS. 22, 23 illustrate additional varieties of oblique cuts embraced hereby.

IN GENERAL

The present invention contemplates using (see FIG. 6) what is called in the art a tape laying head 1 to apply and compact tape assembly 2 (i.e. assembly of tape per se on a backing) to the mold 3 in both the usual (e.g. FIGS. 1A, 1B, 12) tape laying mode and in the novel tail compaction mode (e.g. FIGS. 3A, 3B . . . 5B, 13, 14) according to the invention. Assembly 2 is mounted on a suitable means such as the gantry assembly 5 to position it relative to the mold 3 (which is mounted on a worktable 4) and to move it at predetermined speeds along certain vectors and in certain sequences. The FIG. 6 gantry system is a preferred means for positioning and otherwise moving the present head. The gantry is well-known in the machine tool and the composite art, e.g., see the above cited patents where a variety of gantries are illustrated.

Figure 6:
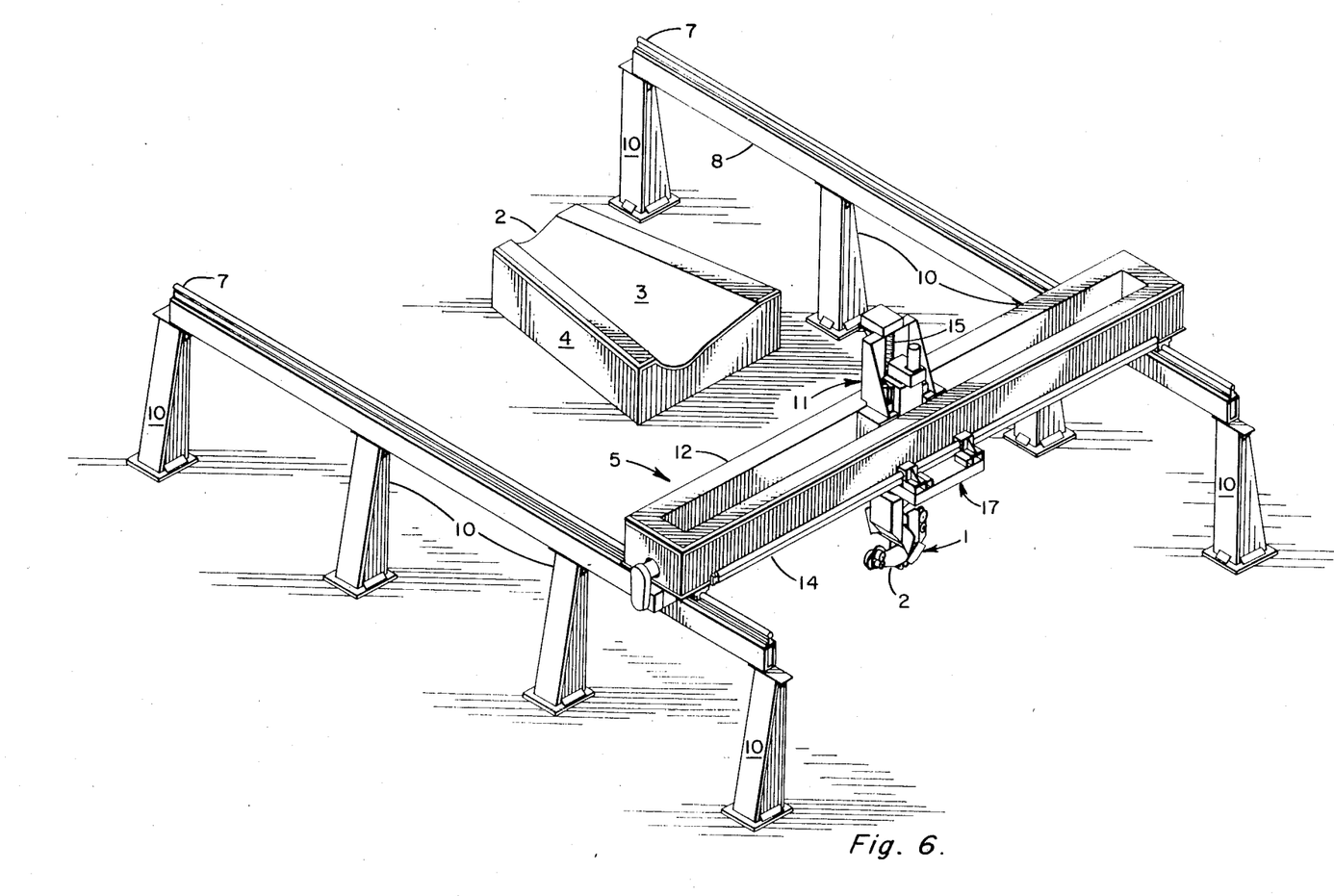
FIG. 6 is an isometric view of a representative tape laying system having a tape laying head according to the invention incorporated in a gantry type moving means.

The gantry system 5 of FIG. 6 includes a pair of ways 7 mounted on longitudinally extending supports 8 which are in turn held above the ground by a plurality of columns 10. The gantry comprises vertical saddle assembly 11 movably supported on beam 12 of some suitable construction mounted between two such ways and designed to be moved back and forth on them. A tape head 1 is supported from saddle 11. Thus, the gantry 5 and saddle 11 are positioned to locate tape head 1 in operating position above one or more molds 3 (only one being shown) and to apply the compacting force by which the composite tape is applied. Alternatively, the beam 12 can be mounted on top of legs, all of which in turn are movable along ways.

Saddle assembly 11 includes positioning means such as a ball screw system 14 to move the head laterally between the ways, elevating means 15 (another ball screw) to manipulate the vertical position of the tape laying head, and also has means 17 to rotate the head about a vertical axis. All of these positioning means are well known and may include a computer as illustrated in the above British publication.

SUMMARY OF CONSTRUCTION OF THE INVENTION (FIGS. 1A . . . 5B)

It is common in this art to use the term "tape" to refer interchangeably to the assembly comprising a strip of unidirectional fibers in a matrix—or composite—removably adhered to a backing and to refer to such a strip per se. To avoid confusion, the term "tape" is used herein to refer to the composite strip per se and the term—tape assembly—or—assembly—to refer to such an assembly.

Figure 1A:
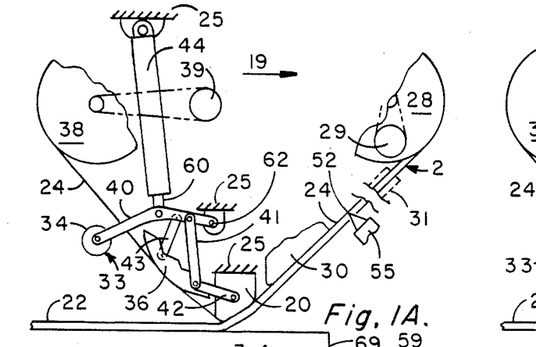
FIG. 1A is a schematic side view (assuming movement to the right) of the preferred form of an apparatus according to the present invention, suitable preferably to lay narrow tape (e.g. three inches wide) on a complex contoured mold, showing the elements in the position for normal tape laying before a tail has to be compacted and showing the position of the elements when severing the tape but not the carrier or support on an oblique line.
Figure 1B:
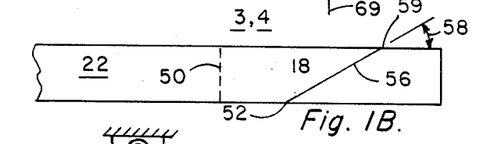
FIG. 1B schematically depicts a top view of the tape of FIG. 1A, also the oblique cut ahead of the first compaction means, and in dotted line (as in all FIGS. 1B–5B) the line of contact or pressure from said first means.

FIGS. 1A, 1B . . . 5A, 5B illustrate the positions of machine parts, tape assembly 2, tail 18 and process steps for carrying out the present invention assuming moving to the right by the head (per arrow 19). The thrust of the matter is to use a first compacting means 20, preferably a shoe, to press the tape assembly 2 (comprising tape 22 on backing or carrier 24 which latter is often a piece of release paper to which the tape is adhered) against the mold.

Head 1 includes one or more support plates 25 (FIGS. 7-10) and mounting plate 26 on which is mounted supply reel 28 which is power driven by electric motor 29 to maintain positive control over the rate of feed of the tape 2. Wound on the supply reel is the long tape assembly 2 mounted on a substrate of backing paper 24 or some similar support from which it is later separated. Assembly 2 (i.e. 22 and 24) moves from a supply reel along a machine support element (secured to the plates 25) comprising a cutting plate 30. The tape 22,24 may also move or past some sort of a heating means such as the optional heating tunnel 31 in order to activate the resinous matrix in which the fibers reside, although preferably no such heating means is used with the invention and tape not requiring heat activation (such as room temperature curing or vulcanizing resins) is preferably selected.

Vertical saddle means 11 ends at a mounting platen 11A to which head 1 is connected as by mounting bolts 32. The head mounting plate 26 extends laterally, is secured to the brackets 25, and affords the mounting surface to locate against platen 11A.

Figure 12:
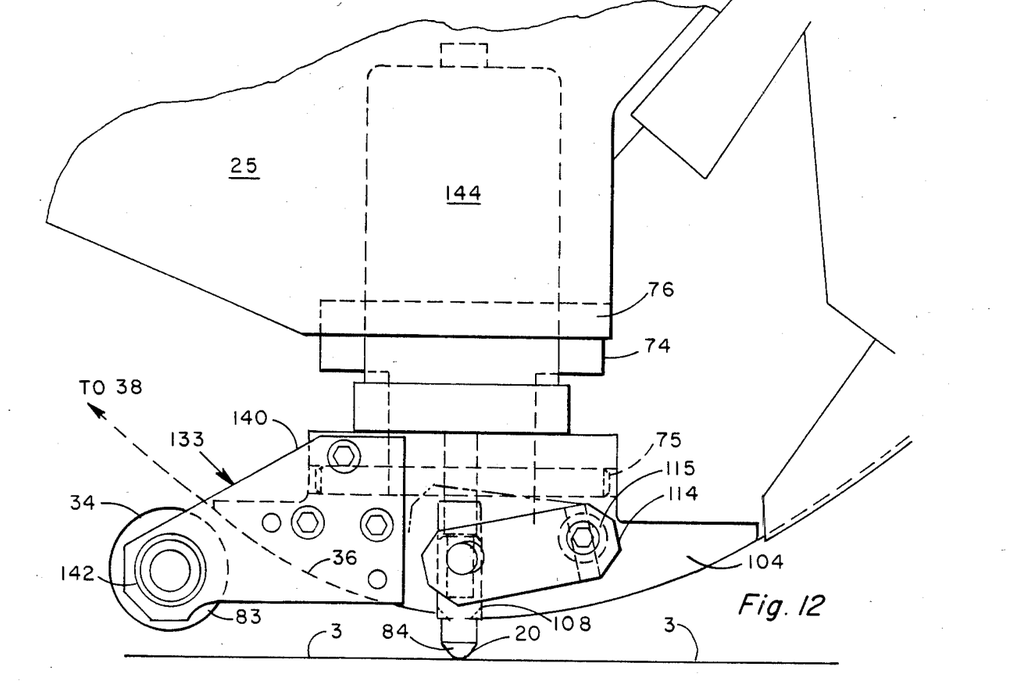
Figure 13:
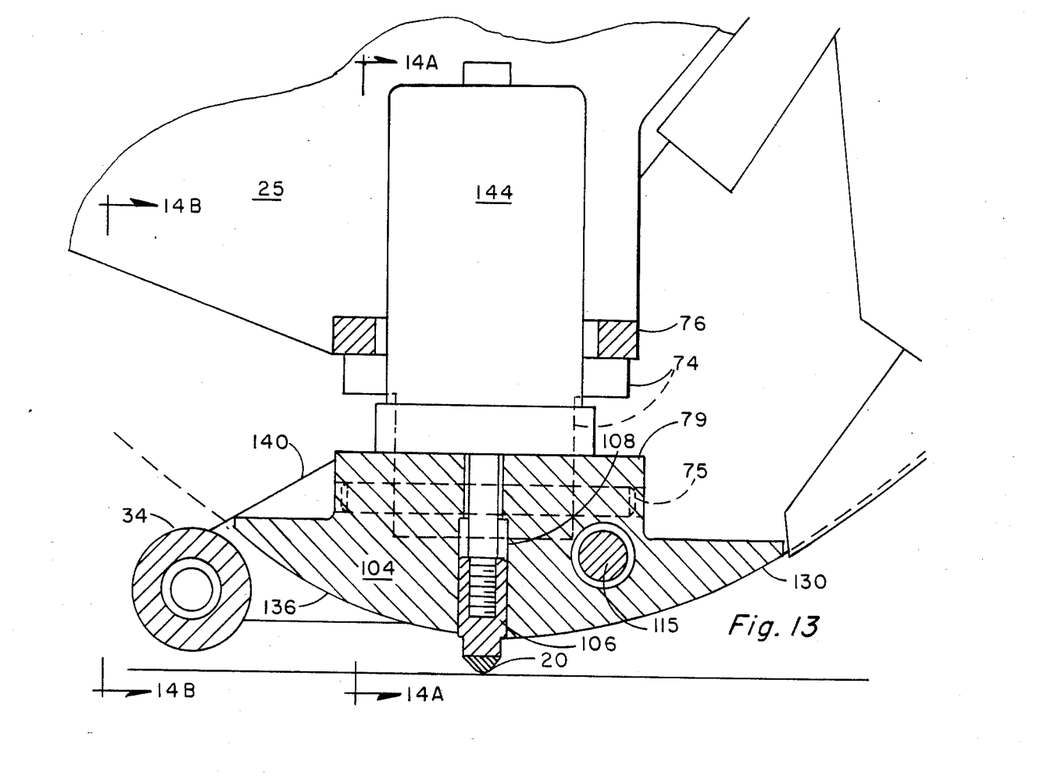
Figures 14A, 14B:
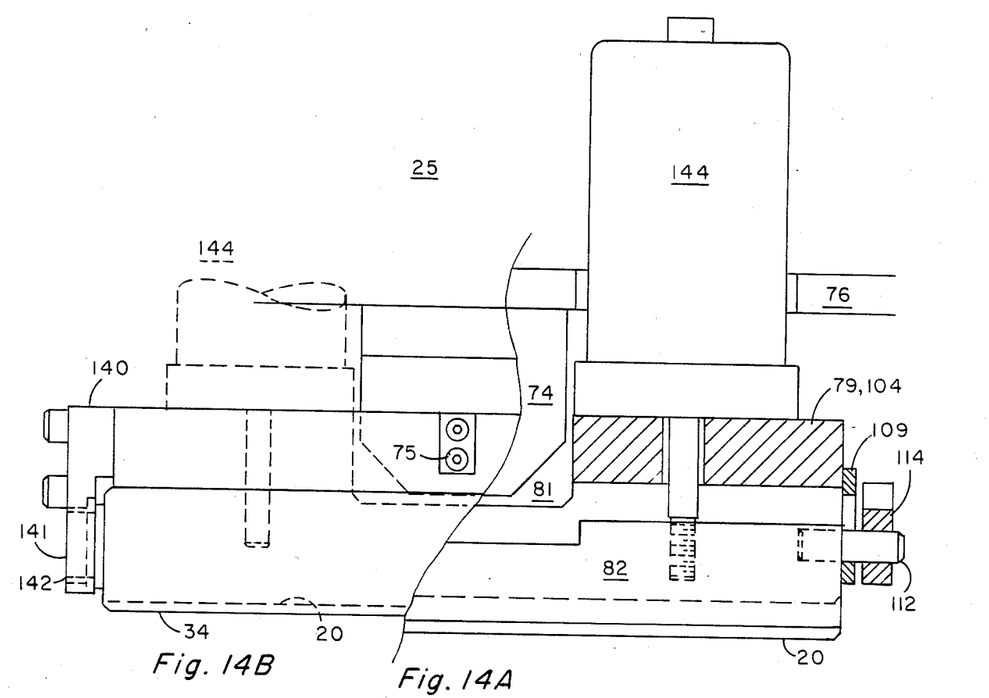
FIG. 14A is a partial rear sectional view along 14A—14A of FIG. 13 showing the blade down and FIG. 14B is a partial rear view along 14B—14B of FIG. 13 showing the roller down and blade up.

The tape assembly 2 moves from the cutting plate 30 underneath the shoe 20 (FIGS. 1-5) or underneath the blade 20 (FIGS. 12, 13 and 14). As the composite 22 and backing 24 pass under the shoe 20 pressure is applied vertically down toward the bottom of these Figs. to compact both of the same 22,24 against the mold 3 and achieve the desired degree of compaction.

In the present invention, composite 22 and its backing 24 are separated at the shoe 20 and indeed a second compaction means 33, preferably including a roller assembly 34 (see FIGS. 7-10) is provided and positioned between composite 22 and backing 24 from which tail 18 is separated at the shoe or as it leaves the shoe. Discarded tape on substrate 35 moves across storage guide 36 to a storage (or discard) reel 38 (FIGS. 4B, 5B shaded area). Drive means such as electric motor, belt and pulley assembly 39 rotates reel 38 and is mounted on the bracket 25, too.

So, mounted on the tape head bracket 25 are a supply reel 28 from which the tape assembly 2 consisting of tape 22 on backing 24 are withdrawn, a forward guide or cutting plate 30, a shoe 20 which is movably mounted for substantial vertical movement in and out of compaction positions, a backing guide 36 across which backing 24 to which is adhered discard 35 peeled from the tape is moved to a storage reel 38, a roller 34 and lever system 40, 41, 42, 43 which in the FIGS. 1-11 embodiment pivot on the bracket 25 relative to the tape head, and a power means (first compaction means) in the form of air cylinder 44. The lever system is connected among the power means and both compaction means to position the latter. In FIGS. 12-14 blade 20 is moved by the power means 44.

The present invention thus has in tandem a first compaction means preferably a shoe (FIGS. 1-11) or a blade (FIGS. 12-14) and a second compaction means which is preferably a roller 34 and is disposed between the tail and the backing which has been peeled away from the tape. The FIGS. 1-11 embodiment is suitable for narrow tapes (up to about 3 inches wide) to be laid on a mold with surfaces from about 0° to about ±20° from horizontal. While the FIGS. 12-14 embodiment is suitable for broader tapes (up to 12 inches or 30 cm wide) on a mold with slopes from about 0° to a slope of about ±1 to 20 from horizontal (vertical to horizontal).

The reel drive motors 29,39 are reversible variable speed DC torque motors (see FIGS. 19-22), are operated in unison to maintain tension, and connect by conventional timing belts and pulleys to the driven members. Shoe 20 and roller 34 each have a non-adhesive cover of Silicon rubber, Teflon, or the like.

Summary of Operation (FIGS. 1A,1B . . . 5C,5D,6)

The gantry 5 of FIG. 6 is used to position the instant tape laying head relative to the mold preparatory to laying tape. Automatic and/or manual control systems may be employed for this purpose but are no part of the instant invention.

Tape assembly 2 is withdrawn from the supply reel 28 and passed along the cutting plate 30 to underneath the shoe 20. The cutting plate, shoe and guide 36 are so positioned relative to each other that they help to break the backing 24 away from the composite strip 22, or to peel the two apart so that the backing with discarded tape 35 can then be passed across the guide to the backing storage reel 38 while the tape is being laid. To facilitate tape release from the backing 24, the guide 36 is preferably up as much as possible when shoe 20 is compacting. The shoe 20 as a result of this is used primarily to compress or compact both the composite 22 and backing 24 (i.e. tape 2) against the mold 3. A dotted line 50 (FIGS. 1B-5B) indicates the line of contact between the tape 2 or composite strip 22 and whichever compaction means 20 or 33 is active.

Both motors 29,39 drive to keep tension on the tape and backing and both drive in reverse to retract unused tail 35. Motor speed (rpm) is determined by head velocity (fpm) along arrow 19 during compaction with shoe 20.

Figures 15, 16, 17:
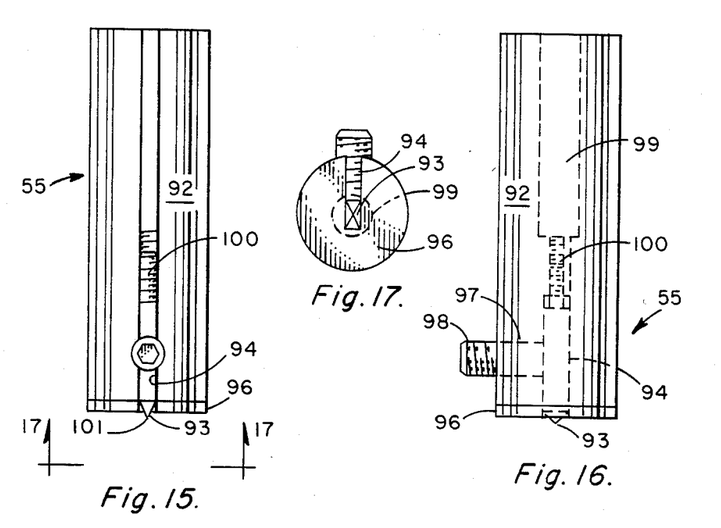
FIGS. 15, 16, and 17 show front side and top views, respectively, of a tape cutting means.

Tape laying continues in the aforesaid manner until the leading edge 52 of the tail 18 or oblique cut begins to pass along the forward guide or cutting plate 30. At this time, the gantry and the feeding of tape from the supply rail are both stopped and the manual tape cutter 55 of FIGS. 15-17 is used by the operator to sever only the composite strip 22 but not the backing 24 by making an oblique cut 56 at some predetermined angle 58 across the tape to the trailing edge 59 of the tail as is illustrated, for instance, in FIG. 1A. Leading and trailing edge refer to the points 52,59 where the cut 56 intersects the edges of the strip 22.

Tape laying then resumes, gantry 5 being moved again in the direction 19 and tape 2 being fed from the supply reel as aforesaid except now only the tape backing 24 connects the supply reel 28, shoe 20, and tape storage reel 38 because the tape is severed along the oblique cut 56 as illustrated in FIGS. 1A through 5b. Tape laying, with the shoe 20 compacting the tail 18 from its leading edge 52 toward the trailing edge 59 of the oblique cut continues. It will be understood that during tape laying the tape head is moved on the gantry to the right as seen in FIGS. 1A-5B and that the tape assembly 2 is fed off the supply reel at a rate commensurate with the desired tension and laying rate.

Figures 2A, 2B:
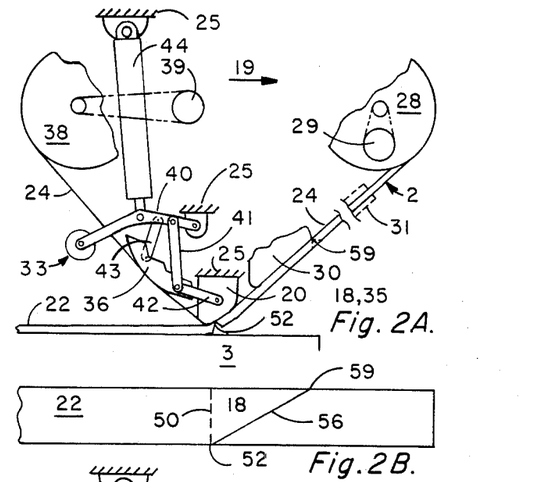
FIG. 2A illustrates the system of FIG. 1 when the leading edge of the oblique cut in the tape has reached the first compaction means while still being borne on the backing paper or support.
FIG. 2B schematically illustrates the tape, oblique cut, and compaction means pressure line of FIG. 2A.

At about the time the cut tape leading edge 52 passes under the shoe 20 and is compressed against the mold, the parts position of FIGS. 2A,2B is realized. The ideal timing is when the leading edge 52 coincides with contact line 50 at the latest as in FIG. 2B, but this is not normally critical so long as the contact line is ahead of and not later than leading edge 52 and the timing usually can be approximate. At this point in time, the power cylinder 44 is operated and the plunger 60 extended from the position of FIGS. 1A, 2A to that shown in FIGS. 3A through 5A. The linkage system 33 comprising the bell crank 40, guide 36, and three links 41,42,43 connecting, respectively, the bell crank to guide 36 and to shoe 20 are caused to operate and swing about the bell crank pin joint to the frame 62 of the head and to assume the position of FIG. 3A. Here, it is noted, the roller 34 has been pushed down against only the composite 22, but not the backing 24, against the mold 3 with a force sufficient to raise the rest of the tape laying head off the mold. This force provides the bias for compaction as it did with the shoe. The roller, of course, comes down kinematically as prescribed by the linkage, and having been originally located between the tape and backing, does not compact the backing at all against the mold or any other substrate. The same group of motions causes the shoe 20 to be removed from compacting contact with the mold and to have the guide 36 function as a support for backing and discarded tape. Thus, there is a substantially simultaneous exchange of active compaction means from the first or shoe 20 to the second or roller 34. A short segment of tape 64 (FIGS. 3A, 3B) will have been compressed by both the shoe and roller due to the machine direction or tandem spacing of the two means 20,34. The backing 24 now, of course, carries away the discarded tape 35, neither 24 nor 35 receiving compaction but only the tape tail 18 receiving compaction. The tail compaction position of a guide 36 (FIGS. 3A, 4A, 5A) eliminates the sharp break of tape about shoe 20 and enhances retention of unused tail 35 on paper 24.

Figure 4A:
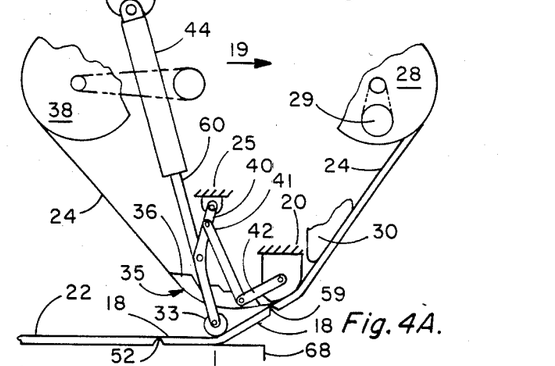
FIG. 4A is a schematic side view of the system of FIGS. 1A, 1B . . . 3B during the compaction by the second compacting means of the tail between the leading and trailing edges of the tail.

The system continues to operate with the tape head 1 being moved to the right, as generally shown in FIG. 4A. Compaction is applied by roller 34 to the tail 18 while the backing continues to be peeled away from the tail and fed to the storage reel. Motors 29,39 are modified in their relative speeds to become torque balanced thus to maintain correct tension on paper and tape.

This procedure (i.e. that of FIG. 4A) continues until the tail trailing edge or end of the severed tape passes underneath the roller as in FIGS. 5A, 5B. At this time the trailing edge 59 has reached the edge 68 of the mold 3 (FIGS. 4A, 5A) and this particular laying pass has been completed and the tape laying head is then lifted from the mold. Once the tape head has been lifted, its connection with the mold (via tape or tail stuck to the backing) has terminated. The operator now rotates the head 180°, then lowers or otherwise repositions, with any needful or desired cutting of a new tail, and another laying pass made in similar manner. It will be understood that in repositioning the sytem for a new course, it will be necessary to reversely drive the tape feeding system and to position the new end of the tape so that it will properly engage whatever mold end is supposed to be laid next. Preferably, the retained tip 52 is brought up under the shoe 20.

The Embodiment of FIGS. 7–11, 18

Here is illustrated an embodiment for practicing the instant invention as applied to laying narrow composite 22 of about three inches (76 cm) width. The same reference numbers as above are used for similar parts, but in FIG. 18 reference numbers also show where other components are secured e.g. 28,29 38,39 show where motors, drive pulleys, spindles, tapes, etc. are mounted.

Figure 8:
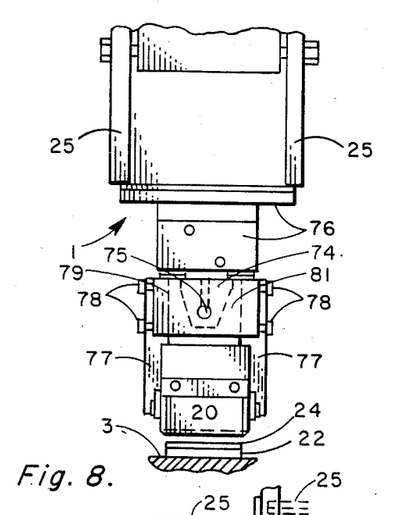
FIG. 8 is a view along section 8—8 of FIG. 7 with the cutting plate removed for clarity.
Figures 18, 24:
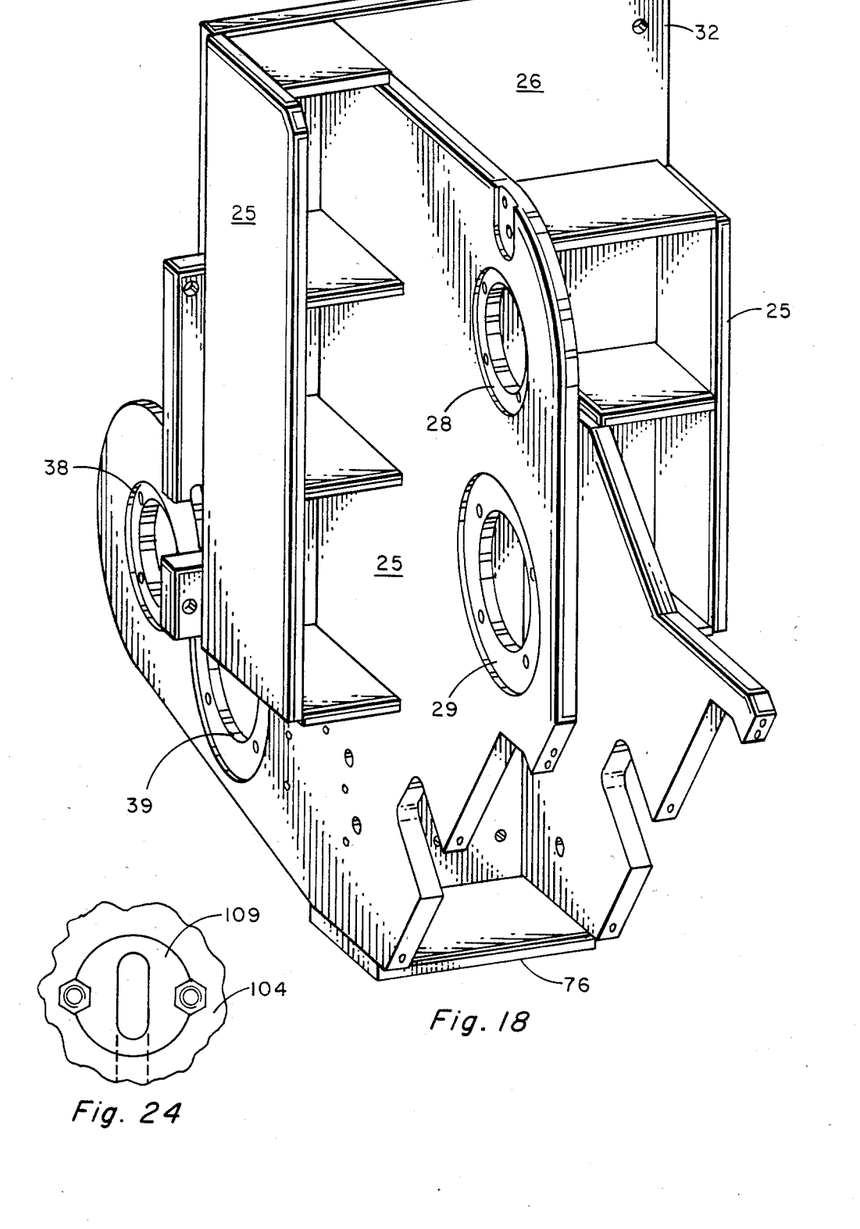
FIG. 18 illustrates a typical support bracket assembly 25,26, etc. for the FIGS. 1-11 embodiment.
FIG. 24 illustrates the limit means for blade motion of the FIGS. 12-14 embodiment.

Brackets 25 are secured by bolts 32 to a head positioning output member platen 11A which is in turn supported from and part of gantry 5. As best shown in FIGS. 8,18, a bridge member 76 is secured across the bottom of the two brackets.

Secured underneath bridge 76 is bearing block 74 which a bearing pin or shaft 75 rotatably connects to the movable tilt block 79 to which shoe support struts 77 are secured by suitable fastening means such as bolts 78. Tilt block 79 is hollowed out centrally (dotted lines 81 in FIGS. 7,8) to provide room for it (79) to swing about block 74 on pin 75.

The bearing structure just described provides a means for the head to respond to cross-machine slopes by tilting. For this reason, the first and second compaction means 20,33 are both supported from the tilt block 79 (i.e. to pivot from same) and power means 44,60 connects to roller arm 40 by a spherical bearing or other suitable means at drive pin 88.

The cutting plate 30 is of heavy sheet metal held at each end by screws 80. The shoe 20 is preferably a contoured rigid member or blade 82 machined from a suitable metal and covered with a replaceable resilient covering 84 made of material which has a low coefficient of friction and minimum adhesive and cohesive properties to or with the resin in the tape being laid, preferably silicon rubber. As shown in FIGS. 7 through 10—this low friction nonadherent coating comprises a sheet of material secured by a plurality of bolts to the core shoe member 82. In FIGS. 12–14 the silicon rubber is molded onto or adhered to a metal backing rib. The roller is preferably covered with a similar material 83.

The side of the shoe facing forward, i.e. in the direction of intended movement when the shoe is operating as a compacting means, is shaped to coincide substantially with an extension of the plane of the cutting plate. The angle at the bottom of the shoe is chosen to be in the range of from 0° to about ±20° from horizontal for FIGS. 1–11 embodiment and from about 0° to a slope of about ±1 in. 20 for the FIGS. 12–14 embodiment to enhance the separation of the backing from the tape. This angle will vary from one system or application to another depending on a number of factors such as—the resin in the tape being laid, the covering on the shoe itself, and the pressure required for compaction.

A shoe is preferred for the first compaction means because it and the tape-on-backing do not wander laterally and the tape gets laid where it is supposed to be. A roller is preferred for the second compaction means because there is less drag on both the tail and mold (the roller or other means engages the mold because the tail is too narrow or narrower) hence less scuffing on previous lays.

Figure 7:
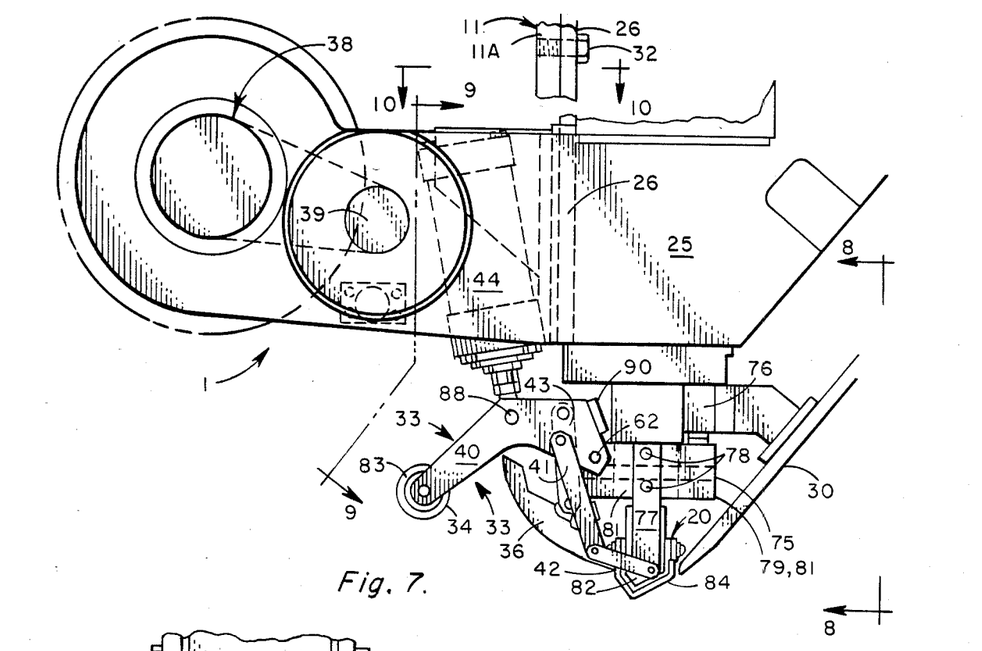
FIG. 7 is a side view of a preferred embodiment of the invention described schematically in FIGS. 1-5.
Figure 9:
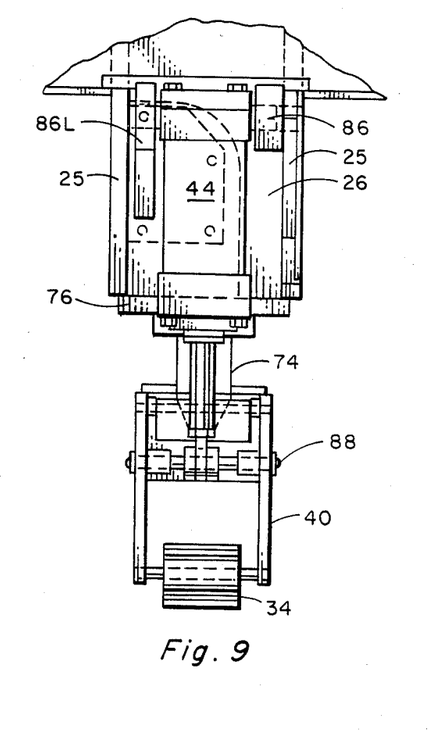
FIGS. 9 and 10 are views along sections 9—9 and 10—10, respectively, of FIG. 7 with the storage guide and some roller links omitted for clarity.
Figure 10:
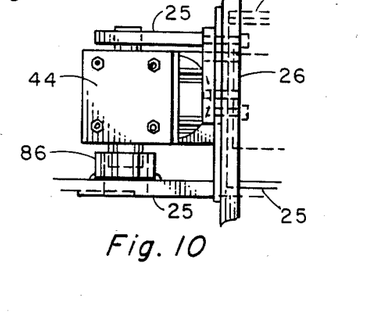
Figure 11:
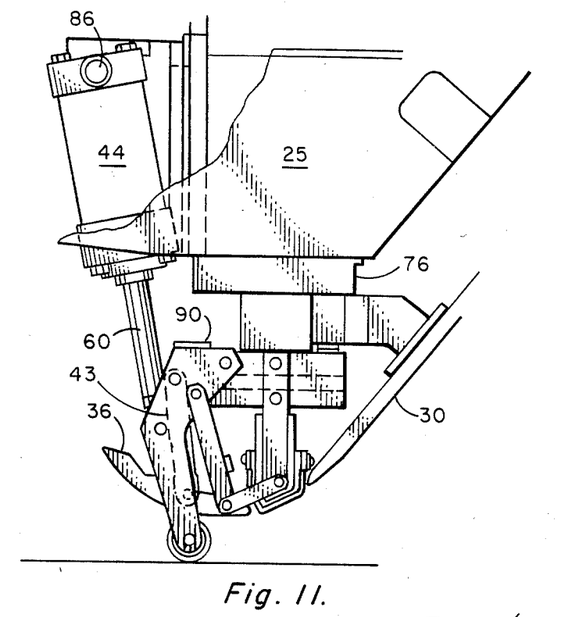
FIG. 11 illustrates the apparatus of FIG. 7 when arranged in a tail compacting position against the mold.

The power cylinder 44 and guide positioning means 33 of FIGS. 7–11 include pairs of bell crank 40 and the guide links 41,42—one of each pair being on a side (FIG. 9). The power cylinder is suspended at its upper end on a pair of trunions 86 (FIGS. 9, 11) between the brackets 25. The roller 34 is rotatably suspended from the tilt block between the free ends of the pair of bell cranks 40 which in turn is rotatably supported at bearing 62 from frame 25. The plunger 60 swingably connects the cranks 40 (FIGS. 7, 9, 11). The pair of guide links 41,43 are one on each side and a pair of shoe cranks 42 are rotably secured at one end to one of the shoe, strut 77 or frame 25 and at the other to link 41. The bell cranks are connected to the plunger 60 by a cylinder drive pin 88 in the mid region of the crank, and by a stop bar 90 located across the forward end of the two bell cranks.

The power cylinder is an air cylinder supported from a pair of trunions, in well-known manner, connected at the upper end between the brackets. One of these trunions (86L) for ease of installation, is actually separate from the corresponding bracket so that it can be adjustably positioned for the final location of the cylinder.

Method of Tape Laying

The method according to this invention involves severing composite tape 22 to form a tail 18 and a discard 35 but not severing the backing paper or substrate 24, separating the backing and the tape, and then applying the tail to a mold by compacting same thereagainst while avoiding compacting the backing. Further, the method comprehends steps of cutting strip 22 obliquely (as along 56) to sever it, not severing the backing at all, separating the backing from the strip after the oblique cut, but not before it, applying the tape assembly 2 before the cut to a mold 3 by pressing on the backing before the cut so that both the backing and composite strip are compacted, and then pressing the composite the tail 18 but the not the backing after said oblique cut so that the tail but not the backing is compressed against the mold. The method preferably embraces compaction of the full width tape with a blade or foot and compaction of the tail by rolling contact. In all events, the method includes locating the second compaction means between the separated backing and the tape or tail.

The Manual Blade Cutter 55 of FIG. 15

The blade cutter 55 comprises a metal body 92, preferably made of aluminum, which supports the cutting stylus or blade 93 as well as providing a handle for the user to grasp. This aluminum body has a slot 94 milled on one side so the blade can be inserted therein, a teflon or other low frictional (nonstick) surface 96 (silicon rubber, teflon) secured to the end through which the blade extends, a horizontal threaded hole 97 for receiving a blade locking screw 98, and a centrally located bored and end tapped hole 99 for receiving a blade adjustment screw 100. The blade or stylus is thus locatable or positioned for thickness of cut so that its cutting tip 101 will only sever and cut the composite 22 but will not sever the paper 24, preferably not even cutting it at all. A machine for severing the strip 22 (not backing) on the fly, i.e. without stopping the tape feeding off supply reel, may also be used but is not part of the present invention.

The Embodiment of FIGS. 12–14, 24

This embodiment, as noted above, is especially adapted for the laying and compaction on substantially flat surfaces (not necessarily level, though) of a composite strip from about 6" to about 12" wide. It differs mechanically from the above-described embodiment of FIGS. 1–11 in using as the first compaction means the blade 20 shown in FIGS. 12–14 instead of the broader shoe 20 of FIGS. 1–11 to enhance the pulling away of the backing 24 from the composite 22 and making compacting type contact of roller or blade by moving the blade 20 relative to the frame 25 (instead of the roller-)—vertically in this instance—and having the roller 34 (second compaction means) revolvably supported from the frame by fixed trailing struts 140. A pair of single acting spring biased air cylinders 144 are frame mounted and comprise the power means to raise and lower the first compaction means.

In FIGS. 12–14, the same reference numbers as in FIGS. 1–11 are used for the same parts (e.g. frame 25) but a few similar parts are designated by 100 added to the FIGS. 1–11 reference (e.g. power means 44 becomes cylinders 144, roller support 40 is strut 140 and fore and aft surfaces 30,36 are 130 and 136), as a matter of convenience and without prejudice to rights hereunder merely because of the notation.

The system of FIGS. 12–14 permits cross-machine tilting by a structure very like that of FIGS. 1–11 and for the same purpose of accommodating a mold surface that slopes cross-machine but differs by applying power to blade 20 to position same vertically hence to engage or disengage roller 34 from compacting engagement with the mold 3. Tilting swings the tilt block 79 (which is preferably integral with the upper part of the blade support 104 which in turn combines surfaces with backing guide 136 and cutting surface 130) about the pin 75 to a non-horizontal position as seen in FIG. 14.

Blade 20 of FIGS. 12–14 is raised and lowered by a pair of double acting air cylinders 144 respectively supported on and secured to the top surface of tilt block 79. Thus all blade power and movement is from and relative to the block. Air cylinders are definitely preferred to hydraulic in order to protect the composite product from destruction in the event of an oil leak. Cylinders 144 extend up through suitable openings in bridge 76 and their plungers are screwed into tapped holes 105 in the body 106 of blade 20. A vertical slot 108 extends completely across blade support 104 and the blade 20 slides vertically therein. Limits on vertical travel are conveniently provided by stop plates 109 (FIG. 24) fixed to support 104 at each end of slot 108, each plate having a vertical slot, the upper and lower ends 110,111 of which vertical limits on blade travel by engagement with horizontal end pins 112 that protrude out from the blade body. Each end pin 112 also engages rotatably an arm 114 which is fixedly secured to the torque bar 115. The torque effect of arms 114 on each end of bar 115 gives stability to the position of the blade: if the blade does not move the same amount at each end when raised or lowered, a torque is created along the bar 115 and the blade is moved thereby to a corrected position.

Roller 34 is supported between a pair of fixed trailing struts 140 at a position such that retraction upwardly of blade 20 lands the roller on the mold 3. The struts are secured as by bolts to the ends of the blade support. Journals 141 extend from the ends of the roller and in turn are rotatably mounted in the struts. A low friction bearing 142 such as a needle or roller bearing may be provided between the journal and strut.

The Next Lay and Torque Motor Operation (FIGS. 19,20,21,21B)

Commercially available torque motors 29,39 are used for this invention. They are variable speed reversible direct current motors. The mode of FIGS. 19–21 maintains tension during tape laying and compaction and during reset. Inasmuch as the tape and storage reels 28,38 are rotated and/or have torque applied to them in the respective same directions via belt-and-pulley drives as their drive motors 29,39 only said reels are shown and numbered for the sake of drawing clarity, it being understood that the directions of torque of the motors are the same as that of their reels and the descriptions are to be read but that the motors and reels may be caused to rotate in a direction different from the torque direction.

In the composite art, this torque motor manipulation is called the "U axis".

Figure 19:
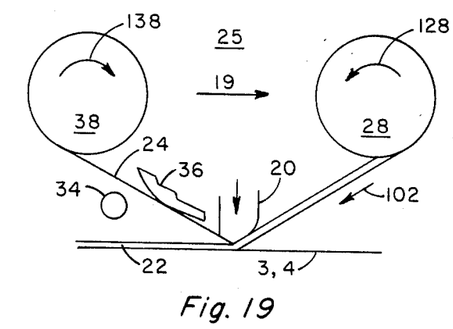
FIGS. 19, 20, 21A and 21B show a preferred mode of torque motor and tape drive operations.

FIG. 19 illustrates the direction of torque of motors 28,38 when compacting the full width of the tape. Actually, gantry motion and that of the tape head under blade 20 is that of arrow 19 and causes compaction of the tape under blade 20 against the mold 3 while also pulling tape assembly 22,24 off of reel 28. Actually, the torque motors are torqued in opposite directions (and, too, the reels) shown by torque arrows 128,138; are stalled out against each other; and the motion of the gantry and compression of tape assembly by the blade cooperate to pull off the tape in the arrow direction 102 but the motors do rotate sufficiently to permit this. Tape assemblies 2 and backing are thusly kept under tension en route from and to reels 28,38. At this time, the parts are in the positions of FIGS. 1A,1B,2A,2B. That is, the compactor 34 is lifted out of tape engagement and the backing guide 36 is retracted to enhance the "breakaway" effect of pulling the tape assembly under the blade 20.

Figure 3A:
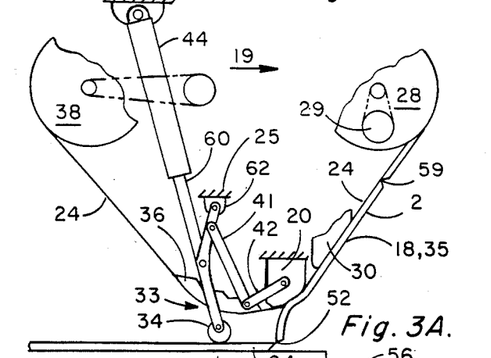
FIG. 3A illustrates the system of FIGS. 1A and 2A when the second compaction means has been moved into place after the FIG. 2A event and before the leading edge of the tail reaches the second means.
Figures 3B, 4B, 5A, 5B, 22, 23:
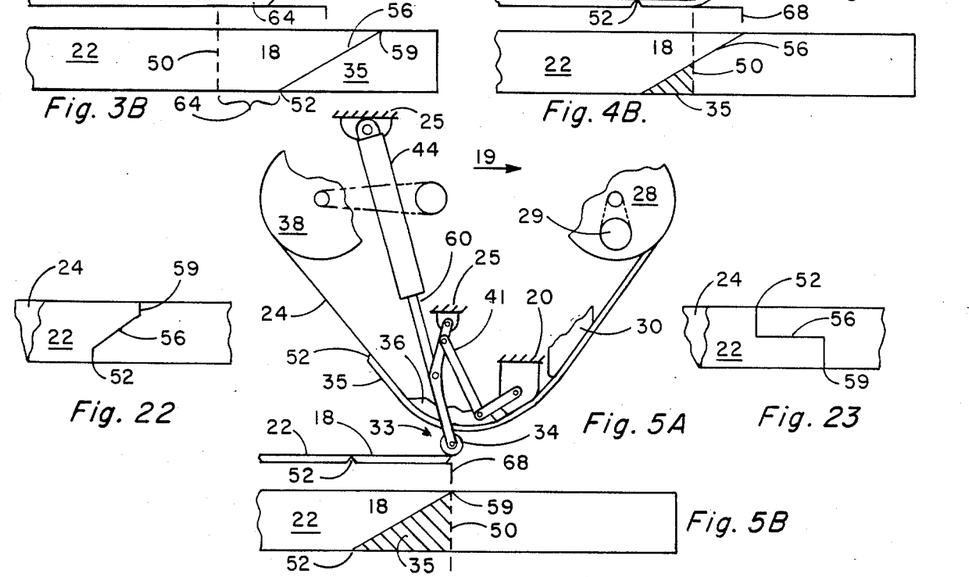
Figure 20:
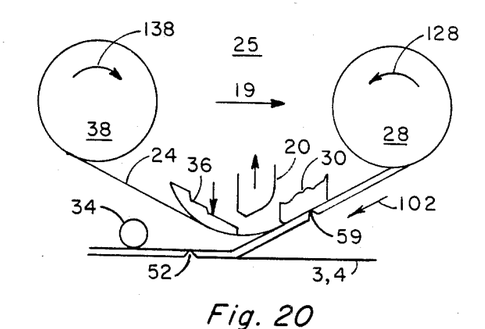

FIG. 20 shows what happens to the torque motors when the roller 34 is lowered (i.e. lands) and the parts move to the position of FIGS. 3,4,5. Actually, the torque motors continue torquing as before, but the guide 36 also is forced more heavily against the unused tape on backing 35,24 to provide less of a breakaway effect so that unused tape 35 more readily clings to backing 24.

Figure 21A:
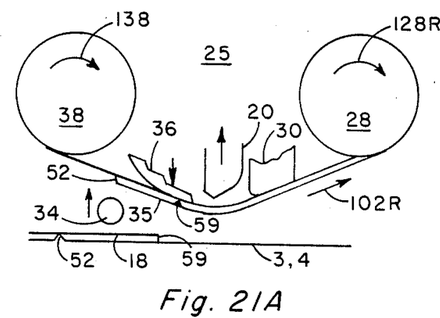
Figure 21B:
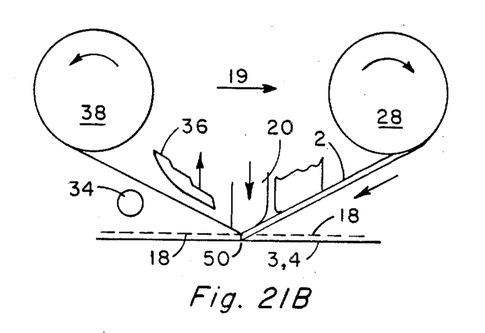

FIG. 21A shows what happens at the start of and during reset, i.e. when the system is being moved to the position for the next lay and the tape assembly 2,35 being moved to utilize the unused oblique cut tail 35. First, the entire head is lifted away from the mold. Backing and tape are no longer connected to the mold. The torque motor 29, hence reel 28, is then reverse rotated 128R to rewind until the former unused leading edge 52 comes underneath blade 20 at which instant rewinding is stopped. But blade 20 has meanwhile been retained in the lifted position of, e.g., FIGS. 3A,4A,-5A,21A out of "breaking" contact with the tape assembly because to "break" the tape across blade 20 as in FIGS. 1A,19 causes fibers on oblique cuts 56 to fray, splay, and generally come apart from each other and from the backing. Guides 30,35 also engage the tape assembly per FIGS. 3A,4A,5A,21A to provide a shallower angle and enhance retention of 35 on backing 24.

After the entire head has been moved to its new laying position and rewound per FIG. 21A, the remaining tip 52 of part 35 is directly underneath blade 20, and it is then time to land the blade and repeat. This is done by lowering the entire head and blade 20 which compresses the parts (pins) unused tip 52 of 35 against mold 3, positions of FIG. 21B being assumed: the roller 34 is up. Compaction by moving in direction 19 now compacts backing 22 and the tip 35 thereon. But the backing is release paper or its full equivalent and does not adhere significantly, if at all, to mold 3. Also, the tape 35 being compacted gets wider in direction 19 this time so any backing adhesion problem dwindles as movement continues to the left in 21B. Note that this preferred mode of reset involves not using the second compactor (i.e. when starting with a tip on uncut backing) while alternate lays do. Similar events can occur at each end of the lay, i.e. at each edge of mold 3.

Types of Oblique Cuts (FIGS. 22,23)

Compaction of other cuts 56 than the straight but angled cut of FIGS. 1–21 are embraced hereby. FIGS. 22,23 illustrate by way of example but not limitation other types of cuts that are embraced in our use of the term "oblique". FIG. 22 is an angled sawtoothed while 23 shows a sawtooth with a segment running lengthwise (i.e. parallel with fibers). Curved cuts are also contemplated.

The thing is, compaction hereunder involves compacting less than the full width of the tape when severed (i.e. oblique part) but not the backing—which is not severed—using a roller means.

What is claimed is:

1. A machine for compacting onto a mold composite tape from a tape assembly that includes said tape removably adhered to a backing comprising
a support assembly;
a supply reel on said support;
a storage reel means supported on said assembly;
a first compaction means;
means for supporting said first compaction means at the lowermost portion of said assembly;
a forward guide disposed between said supply reel means and said first compaction means;
a second compaction means supported at a location between said first compaction means and said storage reel means for compacting tape only against the mold that has been received from said supply reel;
a storage guide disposed between said second compaction means and said storage reel means for directing backing and discarded tape thereon to said storage reel means when said second compacting means is compacting only tape; and
at least one of said compaction means being supported for movement relative to said support assembly; and
power means to move at said one of said first and second compaction means relative to at least one of said support and the other compaction means so that said second compaction means is compacting only tape and said first compaction means has been removed from compacting engagement to said tape assembly.

2. A machine according to claim 1 wherein said one compaction means is said second compaction means and said power means moves said second compaction means relative to said assembly.

3. A machine according to claim 1 further comprising a roller as said second compaction means;
a crank having the roller at one end and a pivot to said support assembly at the other end; and
said power means preferably is a fluid cylinder that moves said roller relative to said first compaction means.

4. A machine according to claim 1 further comprising said first compaction means including a blade or shoe; Power means to raise and lower said first compaction means relative to said support assembly, a roller as part of said second compaction means, roller support means which locate said roller to compactingly engage only said tape when said first means has been lifted out of compacting engagement with said tape assembly as aforesaid.

5. A machine according to claim 4 wherein said power means comprises a pair of cylinders disposed one on each side of center to apply power in single acting fashion, respectively, to each end of said first compaction means.

6. A machine according to claim 4 wherein said power means comprises a pair of fluid cylinders disposed to apply power in double acting fashion to said shoe and a torque bar on said support assembly and connected to each end of said first compaction means.

7. A machine according to claim 1 further comprising linkage means connected among said support assembly and first and second compaction means for substantially simultaneously switching the application of compaction force from one to the other of said first and second means.

8. A machine according to claim 1 wherein said first compaction means further comprises a non-revolvable means.

9. A machine according to claim 1 wherein said first compaction means further comprises a blade secured to said support assembly.

10. A machine according to claim 9 wherein said blade further comprises a covering of low friction non-adhesive material.

11. A machine according to claim 1 wherein at least one of said compaction means further comprises a covering of low friction non-adhesive material.

12. A machine according to claim 1 wherein said second compaction means further comprises a roller.

13. A machine according to claim 1 wherein said second compaction means further comprises a roller having a cover of a low friction material for compactingly engaging said tape.

14. Apparatus for compacting and applying a tail of composite tape to a mold wherein the tape but not the backing is obliquely severed to form said tail prior to said compaction comprising a support assembly;
a support assembly
a first compaction means supported at the lowermost tape assembly compacting position of said assembly;
a second compaction means supported from said assembly at a position between the tail of the tape to be compacted and the backing removed therefrom;
linkage means connected among said support assembly and at least one of said first and second compaction means for applying said second compaction means into compacting engagement with tape tail only while removing said first compaction means from compacting engagement with tape and backing; and
power means to selectively move one of said compaction and said linkage means to switch said compacting engagement between said compaction means.

15. Apparatus according to claim 14 wherein said first compaction means includes a blade having a covering of low friction, non-adhesive material, said blade being secured to said support assembly.

16. Apparatus according to claim 14 wherein said second compaction means comprises a roller supported from said support assembly and of generally cylindrical configuration and having a covering of low friction, non-adhesive material.

17. A method of compacting against a mold composite tape derived from a tape assembly of composite tape supported on a backing comprising the steps of
providing first and second compaction means and means to switch from one to the other,
cutting the tape obliquely and completely but not severing or cutting completely the backing on which it is supported thereby to form a tail with a leading edge and trailing edge;
separating the backing and the tape at about said leading edge;
compacting said tape assembly by applying said first compaction means to the full width of said tape assembly backing;
applying the tail to said mold while compacting with said second compaction means but not compacting the backing and
diverting said backing with unused tape to a storage facility.

18. A method according to claim 17 wherein the first said step of applying further comprises initially compacting the full width of the tape with a first compacting means having a sliding engagement with the backing and then after said cutting, separating, and diverting the second said step of compacting is with a second compacting means having no motion relative to the tail and applied only to the tail not the backing nor the assembly.

19. A method according to claim 17 wherein said first compacting means includes a blade and the full width tape and backing is guided before and the backing only after said first step of compaction through a breakaway angle about the blade that facilitates said separating.

20. A method according to claim 17 wherein said step of providing further comprises
providing as said second compacting means a roller between the unused tape on the backing and the tail to be applied to said mold; and
applying the tail of tape to the mold as aforesaid while compacting the same with said roller.

* * * * *